United States Patent
Dobele et al.

(10) Patent No.: US 8,266,985 B2
(45) Date of Patent: Sep. 18, 2012

(54) DEVICE FOR REDUCING THE DROP IN TRACTIVE FORCE

(75) Inventors: Bernd Dobele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 309 days.

(21) Appl. No.: 12/864,887

(22) PCT Filed: Jan. 26, 2009

(86) PCT No.: PCT/EP2009/050825
§ 371 (c)(1),
(2), (4) Date: Jul. 28, 2010

(87) PCT Pub. No.: WO2009/103591
PCT Pub. Date: Aug. 27, 2009

(65) Prior Publication Data
US 2010/0331141 A1    Dec. 30, 2010

(30) Foreign Application Priority Data
Feb. 18, 2008   (DE) .................. 10 2008 000 327

(51) Int. Cl.
*F16H 37/06* (2006.01)
(52) U.S. Cl. ........................................ 74/661
(58) Field of Classification Search .......... 475/2; 477/2; 74/661
See application file for complete search history.

(56) References Cited

U.S. PATENT DOCUMENTS

| | | | | |
|---|---|---|---|---|
| 3,886,810 A | * | 6/1975 | Sugiyama et al. | 477/41 |
| 4,342,371 A | * | 8/1982 | Smitley | 180/165 |
| 4,591,016 A | * | 5/1986 | Matthews | 180/165 |
| 4,679,646 A | * | 7/1987 | Greenwood | 180/165 |
| 6,503,166 B1 | * | 1/2003 | Van Druten et al. | 475/210 |
| 7,461,568 B2 | | 12/2008 | Dobele | |
| 7,540,346 B2 | * | 6/2009 | Hu | 180/165 |
| 8,142,329 B2 | * | 3/2012 | Ortmann | 477/39 |
| 2005/0071065 A1 | | 3/2005 | Zimmermann et al. | |

FOREIGN PATENT DOCUMENTS

| | | |
|---|---|---|
| DE | 25 52 906 A1 | 6/1977 |
| DE | 32 45 045 A1 | 6/1984 |
| DE | 197 45 995 A1 | 9/1998 |
| DE | 102 30 612 A1 | 2/2003 |
| DE | 103 30 612 A1 | 2/2003 |
| DE | 103 50 143 A1 | 6/2005 |
| DE | 10 2004 002 283 A1 | 8/2005 |
| DE | 10 2004 033 039 A1 | 2/2006 |
| EP | 0 952 023 A1 | 10/1999 |

* cited by examiner

*Primary Examiner* — Dirk Wright
(74) *Attorney, Agent, or Firm* — Davis & Bujold, P.L.L.C.

(57) ABSTRACT

A device for reducing the drop in tractive force during the gear shifting phase of an automatic transmission comprising an automatically actuated drive clutch. The device comprises a rotary storage device that can be coupled, if necessary via two transmission ratio steps (4, 5) that are each assigned a friction clutch (6, 7), to the output shaft of the transmission or, if the transmission has a downstream range group, to the output shaft of the main friction transmission. Only one of the two friction clutches (6, 7) can be activated at any time, and a step up ratio can be achieved and the rotary storage device can be loaded with one of the transmission ratio steps (5). A step down ratio can be achieved and energy can be released from the rotary storage device to the output shaft using the other transmission ratio step (4).

7 Claims, 1 Drawing Sheet

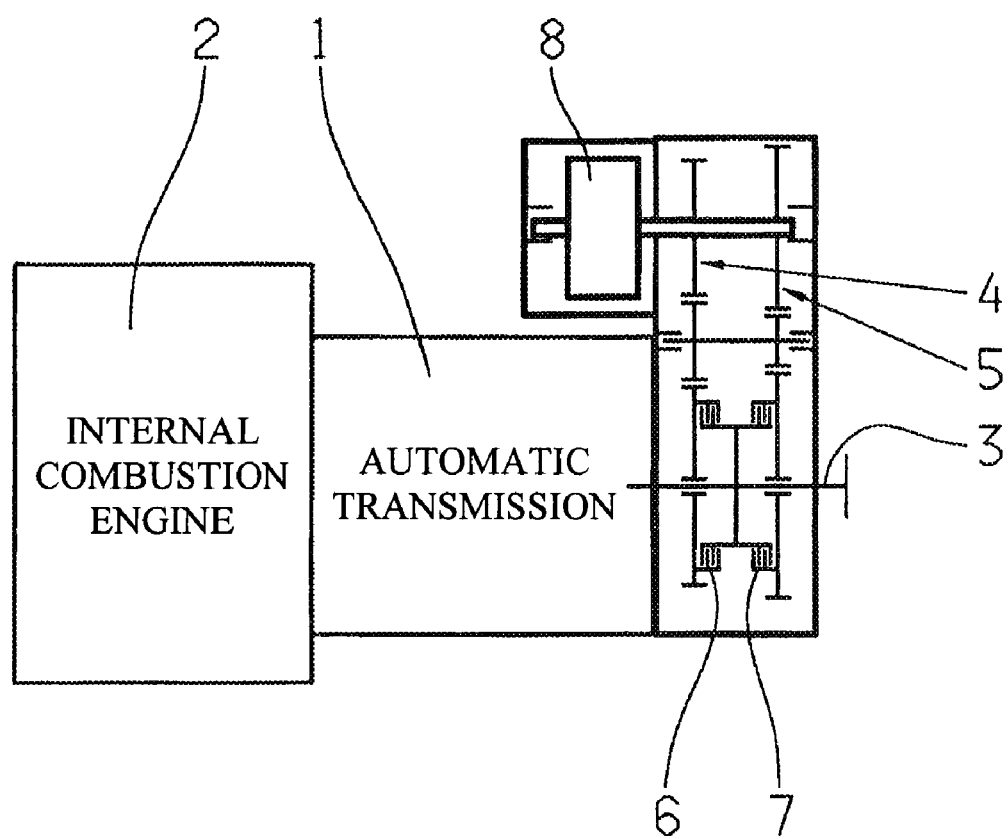

DEVICE FOR REDUCING THE DROP IN TRACTIVE FORCE

This application is a National Stage completion of PCT/EP2009/050825 filed Jan. 26, 2009, which claims priority from German patent application serial no. 10 2008 000 327.1 filed Feb. 18, 2008.

FIELD OF THE INVENTION

The invention relates to a device for reducing the drop in tractive force in the gear shifting phase of an automatic transmission. In addition, the invention relates to a method for operating the device according to the invention.

BACKGROUND OF THE INVENTION

According to the prior art, an automatic transmission comprises an electromechanical clutch control and an electromechanical transmission control as well as control electronics that are connected to the control electronics of the internal combustion engine of the vehicle, generally by means of a CAN bus.

Shifting systems of automatic transmissions have conventional and sometimes manually actuatable actuators comprising a start-up clutch between the drive motor and transmission, and actuators for selecting and shifting the individual gears, wherein the actuators are actuated by means of corresponding piston and cylinder arrangements that are generally hydraulically or pneumatically actuatable, or they are actuated by actuating elements designed as electrical actuators. An example of an automatic transmission is described in DE 102 30 612 A1.

With such transmissions, the necessary interruption of tractive force or the disconnection of the flow of force between the drive motor and transmission to shift gears has increasingly led to the desire to reduce the drop in tractive force during the gear shifting phase because of the lack of acceleration.

A drive device with a transmission, drive motor and shifting clutch is known from DE 10 2004 002 283 A1 according to which a shift/brake clutch is located between the engine and the separating clutch to reduce the tractive force interruption phase while switching in the drive device such that overlapping disengagement and engagement processes of the shifting brake clutch and the separating clutch support the engine torque on a transmission output shaft. This minimizes the duration of interrupted torque and reduces the drop in tractive force.

SUMMARY OF THE INVENTION

The invention is based on the problem of presenting a device for reducing the drop in tractive force during the gear switching phase of an automatic transmission. In addition, a method is presented for operating the device according to the invention.

Accordingly, a device is proposed for reducing the drop in tractive force during the gear shifting phase of an automatic transmission comprising an automatically actuated drive clutch that has a friction clutch having a rotary storage device or flywheel storage device that can friction lock with the output shaft via two transmission ratio steps, each of which are assigned a friction clutch, or, if the transmission has a downstream range group, with the output shaft of the main transmission if needed, wherein one of the two friction clutches can be activated at any time.

According to the invention, a transmission ratio greater than 1 can be achieved with one of the transmission ratio steps (step up ratio), and a transmission ratio that is less than 1 can be achieved with the other transmission ratio step.

In situations outside of a shifting phase for charging the rotary storage device, the friction clutch can be actuated which creates a connection between the output shaft in the rotary storage device by means of the step up ratio, whereby the speed level of the rotating mass is elevated by a specific factor above the level of the rotational speed of the output shaft.

Such situations are preferably those in which the vehicle is accelerated or braked, or situations in which shifting is anticipated. In particular in braking situations, the withdrawal of energy helps accelerate the rotating mass.

In the gear shifting phase, i.e., when shifting gears in the transmission and/or an available front-mounted group, the step up ratio between the output shaft—or the output shaft of the main transmission and the rotary storage device if the clutch assigned to this transmission ratio step is engaged—is deactivated by disengaging the clutch assigned to this transmission ratio step, wherein the clutch assigned to the step down ratio is engaged, overlapping with the torque of the drive clutch, preferably when the torque of the drive clutch falls below a specified threshold.

In this manner, the energy from the rotary storage device is transmitted to the output shaft or the output shaft of the main transmission until the speed-related and mechanical transmission ratio between the rotational speed of the output shaft and speed of the rotary storage device are the same, which advantageously reduces the drop in tractive force during the shifting phase.

After the gearshift, the engine torque increases proportionally to the overlapping rise in torque of the drive clutch. If the torque transferred from the drive clutch exceeds a specified threshold value, the clutch assigned to the step down ratio is disengaged, and the clutch assigned to the step up ratio can be activated once more.

The device for reducing the drop in tractive force is advantageously controlled during the gear shifting phase by means of the existing electronic control unit (ECU) of the automatic transmission.

BRIEF DESCRIPTION OF THE DRAWINGS

The invention will be further explained below with an example with reference to the attached FIGURE which is a schematic sectional view of a drive train with an automatic transmission having a device designed according to the invention for reducing the drop in tractive force during the gear switching phase.

DETAILED DESCRIPTION OF THE PREFERRED EMBODIMENTS

The FIGURE shows an automatic transmission 1 that is connected on the drive side to an internal combustion engine 2. Furthermore, a rotary storage device 8 is provided that can friction lock to the output shaft 3 of the transmission 2 by means of two transmission ratio steps 4, 5 that are each assigned a friction clutch 6, 7; one of the two friction clutches 6, 7 can be actuated at any time according to the invention. The rotary storage device 8 can for example be dimensioned e.g. such that a torque of 1,000 Nm can be applied over a period of one second.

The two friction clutches 6, 7 are preferably constructively joined to form a power-shiftable double clutch as shown in the FIGURE.

One of the transmission ratio steps 5 can be used to step up, i.e., the transmission ratio is greater than 1; this transmission ratio step is activated to load the rotary storage device 8. The other transmission ratio step 4 that can be used to step down is used to transmit energy from the rotary storage device 8 to the output shaft 3. For example, the ratio of transmission ratio step 4 can be 0.8; an example of a value for the ratio achievable with transmission ratio step 5 is 1.25.

According to the invention, the rotary storage device 8 is loaded in situations outside of the gear shifting phase by engaging the friction clutch 7 assigned to the step up ratio 5, wherein the level of speed of the rotary mass of the rotary storage device 8 is thereby elevated above the level of the rotational speed of the output shaft by a predetermined factor corresponding to the achievable transmission ratio.

In a gear shifting phase, the step up transmission ratio step 5 between the output shaft 3—or the output shaft of the main transmission 1 and the rotary storage device 8 if the clutch 7 assigned to this transmission ratio step 5 is engaged—is deactivated by disengaging the clutch 7 assigned to this transmission ratio step 5. In addition, the clutch 6 assigned to the step down ratio 4 is engaged, overlapping with the torque of the drive clutch. In this manner, the energy of the rotary storage device is transmitted to the output shaft or the output shaft of the main transmission, whereby the drop in tractive force is prevented or reduced during the gear shifting phase.

The clutch 6 assigned to the step down ratio 4 is engaged when the torque of the drive clutch of the automatic transmission 1 falls below a specified threshold value.

After the gearshift, the engine torque increases proportionally to the overlapping rise in torque of the drive clutch. If the torque transferred from the drive clutch exceeds a specified threshold value, the clutch 6 assigned to the step down ratio 4 is disengaged according to the invention, and the clutch assigned to the step up ratio 5 can be activated once more.

REFERENCE NUMBERS

1 Automatic transmission
2 Internal combustion engine
3 Output shaft
4 Transmission ratio step
5 Transmission ratio step
6 Friction clutch
7 Friction clutch
8 Rotary storage device

The invention claimed is:

1. A device for reducing a drop in tractive force during a gear shifting phase of an automatic transmission (1) with an automatically actuated drive clutch, the device comprising:
a rotary storage device (8) being connectable with a friction lock by two transmission ratio steps (4, 5) that are each assigned a friction clutch (6, 7) to either an output shaft (3) of the transmission (1) or, if the transmission has a downstream range group, to the output shaft of a main friction transmission, and only one of the two friction clutches (6, 7) being activated at any time, and a step up ratio being achieved, and
the rotary storage device being loaded with one of the transmission ratio steps (5) in situations outside of the gear shifting phase, and
a step down ratio being achieved and energy being released from the rotary storage device (8) to the output shaft (3) with the other transmission ratio step (4) during a gear shifting phase.

2. The device for reducing the drop in tractive force according to claim 1, wherein the two friction clutches (6, 7) are constructively joined to form a power-shiftable double clutch.

3. The device for reducing the drop in tractive force according to claim 1, wherein the device for reducing the drop in tractive force is controlled by an electronic control unit (ECU) of the automatic transmission (1).

4. A method of operating a device for reducing a drop in tractive force during a gear shifting phase of an automatic transmission (1) having an automatically actuated drive clutch, the device comprising a rotary storage device (8) being connectable with a friction lock by two transmission ratio steps (4, 5) that are each assigned a friction clutch (6, 7) to one of an output shaft (3) of the transmission (1) or, if the transmission has a downstream range group, to an output shaft of a main friction transmission, only one of the two friction clutches (6, 7) being activated at any time, and a step up ratio being achieved and the rotary storage device being loaded with one of the transmission ratio steps (5) in situations outside of the gear shifting phase, a step down ratio being achieved and energy being released from the rotary storage device (8) to the output shaft (3) with the other transmission ratio step (4) during a gear shifting phase, the method comprising the steps of:
loading the rotary storage device (8) in situations outside of the gear shifting phase by engaging the friction clutch (7) assigned to the step up ratio (5), such that a speed level of the rotary mass of the rotary storage device (8) is elevated by a predetermined factor corresponding to the achievable ratio above a level of rotational speed of the output shaft;
deactivating the step up ratio (5) between either the output shaft or the output shaft (3) of the main transmission and the rotary storage device (8), during a gear shifting phase, if the clutch (7) assigned to the transmission ratio step (5) is engaged by disengaging the clutch (7) assigned to this transmission ratio step (5); and
engaging the clutch (6) assigned to the step down ratio (4) to overlap with the torque of the drive clutch such that energy of the rotary storage device (8) is transferred to one of the output shaft (3) or the output shaft of the main transmission to one of prevent and reduce the drop in tractive force during the gear shifting phase.

5. The method of operating the device for reducing the drop in tractive force during the gear shifting phase of an automatic transmission (1) according to claim 4, further comprising the step of engaging the clutch (6) assigned to the step down ratio (4) when the torque of the drive clutch of the automatic transmission (1) falls below a predetermined threshold value.

6. The method of operating the device for reducing the drop in tractive force during the gear shifting phase of an automatic transmission (1) according to claim 4, further comprising the step of disengaging the clutch (6) assigned to the step down ratio (4) when the torque transferred from the drive clutch exceeds a predetermined threshold value after the gear shifting phase.

7. The method of operating the device for reducing the drop in tractive force during the gear shifting phase of an automatic transmission (1) according to claim 4, further comprising the step of loading the rotary storage device (8) outside of a gear shifting phase in situations in which either the vehicle is either accelerated or braked, or in which shifting is anticipated.

* * * * *